United States Patent
Rylander

(10) Patent No.: US 9,585,303 B2
(45) Date of Patent: Mar. 7, 2017

(54) MAP BASED SEED VACUUM CONTROL

(71) Applicant: Deere & Company, Moline, IL (US)

(72) Inventor: Dave J. Rylander, Milan, IL (US)

(73) Assignee: Deere & Company, Moline, IL (US)

( * ) Notice: Subject to any disclaimer, the term of this patent is extended or adjusted under 35 U.S.C. 154(b) by 77 days.

(21) Appl. No.: 14/327,844

(22) Filed: Jul. 10, 2014

(65) Prior Publication Data

US 2016/0007523 A1  Jan. 14, 2016

(51) Int. Cl.
| | |
|---|---|
| *A01C 7/04* | (2006.01) |
| *A01C 7/20* | (2006.01) |
| *A01C 7/12* | (2006.01) |
| *A01B 79/00* | (2006.01) |
| *A01C 21/00* | (2006.01) |

(52) U.S. Cl.
CPC ............ *A01C 7/044* (2013.01); *A01B 79/005* (2013.01); *A01C 7/046* (2013.01); *A01C 7/20* (2013.01); *A01C 21/005* (2013.01)

(58) Field of Classification Search
CPC ........... A01C 7/044; A01C 7/042; A01C 7/04; A01C 7/00; A01C 7/20; A01C 21/005; A01C 21/00; A01C 7/121; A01C 7/12; A01C 7/08; A01C 7/046; A01B 79/005; A01B 79/00
See application file for complete search history.

(56) References Cited

U.S. PATENT DOCUMENTS

| | | |
|---|---|---|
| 6,516,733 B1 | 2/2003 | Sauder et al. |
| 2008/0047475 A1* | 2/2008 | Stehling .............. A01C 7/208 111/69 |
| 2009/0118910 A1 | 5/2009 | Carr et al. |
| 2009/0164281 A1 | 6/2009 | Norgaard et al. |
| 2011/0054743 A1 | 3/2011 | Kocer et al. |
| 2012/0266795 A1 | 10/2012 | Silbernagel et al. |
| 2014/0277959 A1 | 9/2014 | Wagers et al. |

FOREIGN PATENT DOCUMENTS

| | | |
|---|---|---|
| EP | 2047735 A1 | 4/2009 |
| WO | WO03055291 A2 | 7/2003 |
| WO | WO2008024760 A2 | 2/2008 |

OTHER PUBLICATIONS

Grisso et al., "Precision Farming Tools: Variable-Rate Application," Virginia Cooperative Extension, Publication 442-505, 2011, pp. 1-16.
"AgLeader: Application," Precision Management Services, 4 pages, accessed Jul. 10, 2014, http://www.agronomytech.com/application.
Extended European Search Report, dated Dec. 1, 2015, regarding Application No. EP15176114.5, 9 pages.

* cited by examiner

*Primary Examiner* — Christopher J Novosad
(74) *Attorney, Agent, or Firm* — Yee & Associates, P.C.

(57) ABSTRACT

A method including adjusting a changeable component of a seed planting machine when switching from a first variety of seed to a second variety of seed during planting, wherein the adjusting is based on a location of the planting machine.

9 Claims, 7 Drawing Sheets

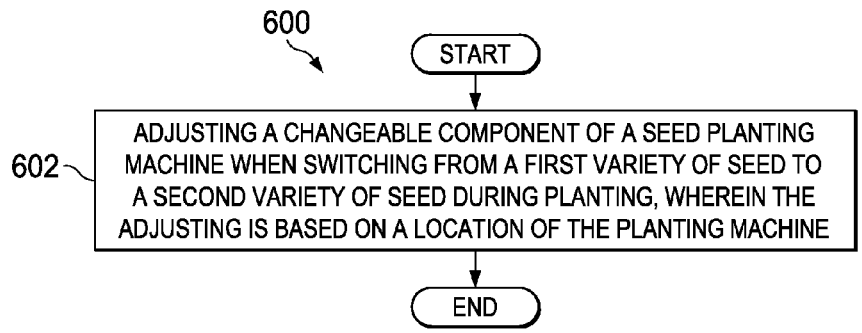
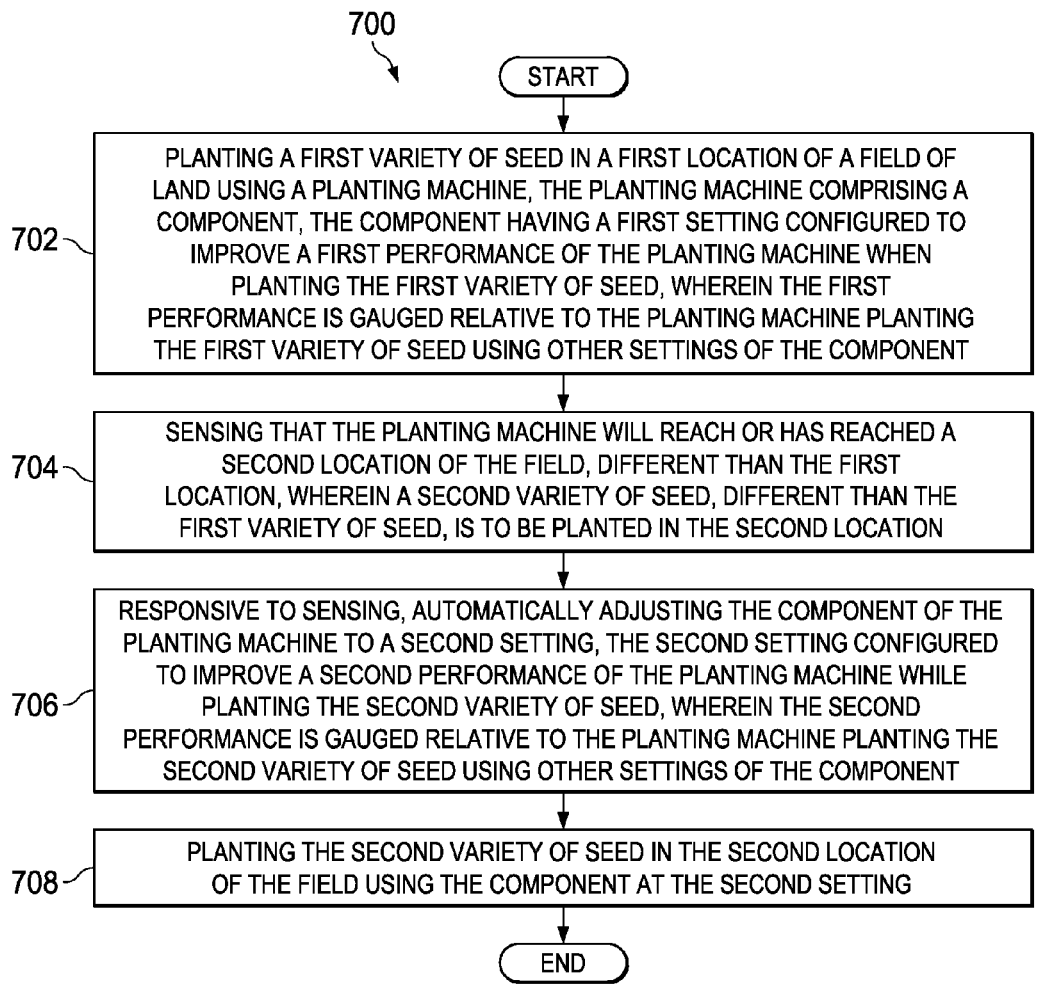

FIG. 10
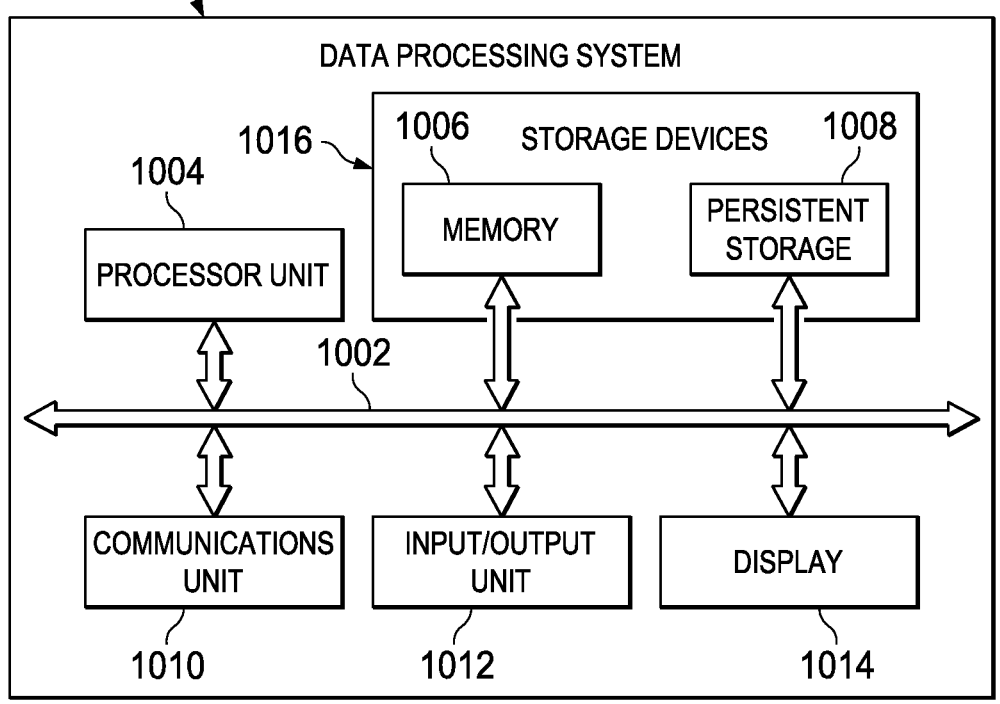
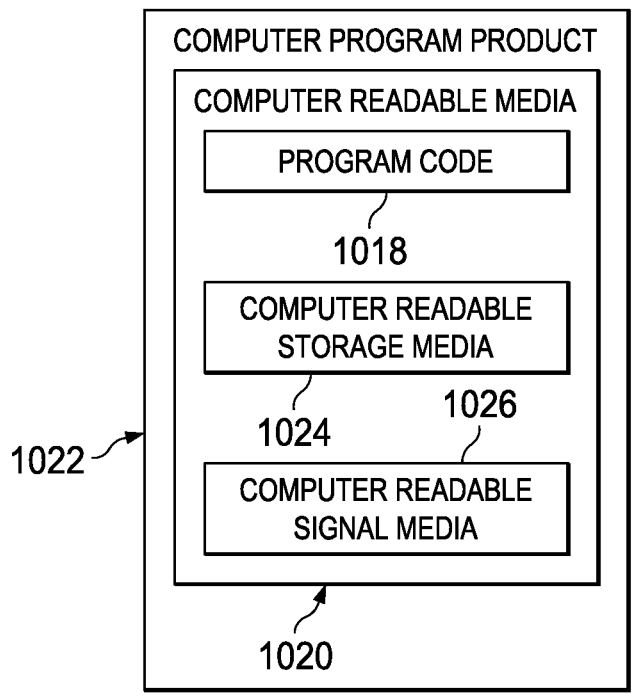

MAP BASED SEED VACUUM CONTROL

FIELD OF THE DISCLOSURE

The present application relates generally to techniques for planting seeds by a seed planter, and in particular is directed to improved vacuum seed meters for multiple variety planting operations.

BACKGROUND

Seed planters may be used to automatically plant seeds into rows of a field. Whether towed or part of the tractor or other machine, seed planters dispense seeds at a controlled rate into one or more seed furrows or rows as the planter moves along a field. Seed planters typically have several planting or row units in a spaced-apart arrangement such that several rows can be simultaneously planted.

The planting or row units may include one or more seed hoppers that hold seeds. A seed hopper holds a seed supply that feeds a seed meter. In turn, a seed meter may control a rate at which seeds are dispensed as the seed planter traverses a field. Each planting or row unit may also include other equipment, such as a furrow opener and/or a furrow closer, or other equipment.

Attention is turned to the seed meter in particular. Seed meters may use a variety of different mechanical principles to control how seeds are dispensed, but generally all seed meters are designed to dispense seeds at a controlled rate, often one seed at a time. However, seed meters will have occasional errors, for example, "doubles" in which multiple seeds are dispensed when only one seed is intended to be dispensed, or "skips" in which no seed is dispensed when a seed is intended to be dispensed.

One particular type of seed meter is known as a vacuum seed meter. A vacuum seed meter may use a vacuum to control how seeds are taken from a hopper seed pool and are dispensed from the meter. In one specific example, a vacuum seed meter may use a vacuum to gently pull and hold individual seeds to a seed disk. The disk then rotates, and at a designated place during rotation, the seed is released from the seed disk and dispensed for planting. A vacuum seed meter may include a double eliminator configured to remove doubles at individual seed apertures of the seed disk. Vacuum seed meters may plant a wide variety of crops and seed types by, for example, changing seed disks.

Multiple variety planting is a planting operation in which multiple varieties of seed are to be dispensed in a field. Typically the varieties of seed are of the same plant species, but the varieties have different characteristics. For example, one variety of corn may be more disease resistant but have a lower yield than a second variety of corn. If a particular part of a field has had a history of disease, then the disease resistant variety may be planted in that particular part of the field, but the higher yield variety may be planted in other parts of the field. A drought resistant variety of corn may be desired for planting in a third part of the field where water is expected to be scarce. One possible goal of multiple variety planting is to maximize the total overall yield of a field.

Thus, multiple variety planting utilizes a map-based prescription that indicates what varieties of seed are to be planted in corresponding different portions of a field. The physical characteristics of the different seed varieties, may suggest that the seed meter be adjusted differently for the different varieties. However, since adjustment of the meters will be difficult or impossible to accomplish while planting, the meter may be adjusted to an acceptable, but not optimal, setting and left there for all seed varieties. Thus, devices and methods are desired that allow a seed meter, including vacuum seed meters in particular, to automatically implement changes to the seed meter in order to optimize planting of different varieties of seed at different times during a multiple variety planting operation.

SUMMARY

The illustrative embodiments include a first method. The method includes adjusting a changeable component of a seed planting machine when switching from a first variety of seed to a second variety of seed during planting, wherein the adjusting is based on a location of the planting machine.

The illustrative embodiments include a second method. The second method includes planting a first variety of seed in a first location of a field of land using a planting machine, the planting machine comprising a component, the component having a first setting configured to improve a first performance of the planting machine when planting the first variety of seed, wherein the first performance is gauged relative to the planting machine planting the first variety of seed using other settings of the component. The second method also includes sensing that the planting machine will reach or has reached a second location of the field, different than the first location, wherein a second variety of seed, different than the first variety of seed, is to be planted in the second location. The second method also includes responsive to sensing, automatically adjusting the component of the planting machine to a second setting, the second setting configured to improve a second performance of the planting machine while planting the second variety of seed, wherein the second performance is gauged relative to the planting machine planting the second variety of seed using other settings of the component. The second method also includes planting the second variety of seed in the second location of the field using the component at the second setting.

The illustrative embodiments also provide for a multiple variety planter. The multiple variety planter includes a planting machine comprising an adjustable component, the adjustable component being adjustable between a first configuration and a second configuration, the first configuration set to maximize planting efficiency of a first variety of seed relative to other varieties of seeds, the second configuration set to maximize planting efficiency of a second variety of seed relative to other varieties of seeds. The multiple variety planter also includes a controller in communication with the automatic seed planter, the controller configured to automatically adjust the adjustable component between the first configuration and the second configuration based on a particular location of the automatic seed planter in a field of land comprising a plurality of different locations that include the particular location.

The illustrative embodiments provide for a third method. The third method includes adjusting a vacuum level applied to a vacuum seed meter of a seed planting machine based on an attitude of the seed planting machine.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

FIG. 6 is a flowchart of a method of adjusting a changeable component, in accordance with an illustrative embodiment;

FIG. 7 is a flowchart of a method of planting seeds, in accordance with an illustrative embodiment;

FIG. 10 is an illustration of a data processing system, in accordance with an illustrative embodiment.

DETAILED DESCRIPTION

The illustrative embodiments recognize and take into account that available multiple variety seed meters are not automatically optimized for the different variety seeds when changing what variety of seed is dispensed during a multiple variety planting operation. The illustrative embodiments provide for a seed meter configured to automatically adjust to optimize planting of a particular seed variety within a particular location of a field during a multiple variety planting operation. In an illustrative embodiment, the term "automatically adjust" means the machine makes adjustments to the seed meter in real time while planting seed, with no input from the operator.

The illustrative embodiments recognize and take into account that multiple variety planting operations typically use a map-based prescription that indicates what specific variety of seed is to be planted in a corresponding specific portion of a field. The illustrative embodiments thus provide for a seed meter that automatically adjusts in order to dispense a specific variety of seed based on a location of the seed planting machine within the field. Specifically, the illustrative embodiments may automatically adjust a double eliminator, a vacuum level, or both in order to most efficiently dispense a specific variety of seed at a particular portion of a field. The settings of the double eliminator and the vacuum level may be made based on a size and shape of a seed of a particular seed variety.

Thus, the illustrative embodiments provide for an optimal adjustment of a row unit meter system for variable variety planting situations. To accomplish this goal, the illustrative embodiments may include two parts that work with a map-based prescription system. The first part stores vacuum and double eliminator settings in map data with the variety locations. The second part provides for a method to adjust the row units for vacuum setting and double eliminator setting as the planter transverses the field. Vacuum control may be accomplished by a closed loop control system based on the vacuum sensor and control of a tractor selective control valve (SVC). The double eliminator (DE) setting may be controlled with a linear actuary used to correctly position the position of the double eliminator. Other control methods are possible.

Figure 1:
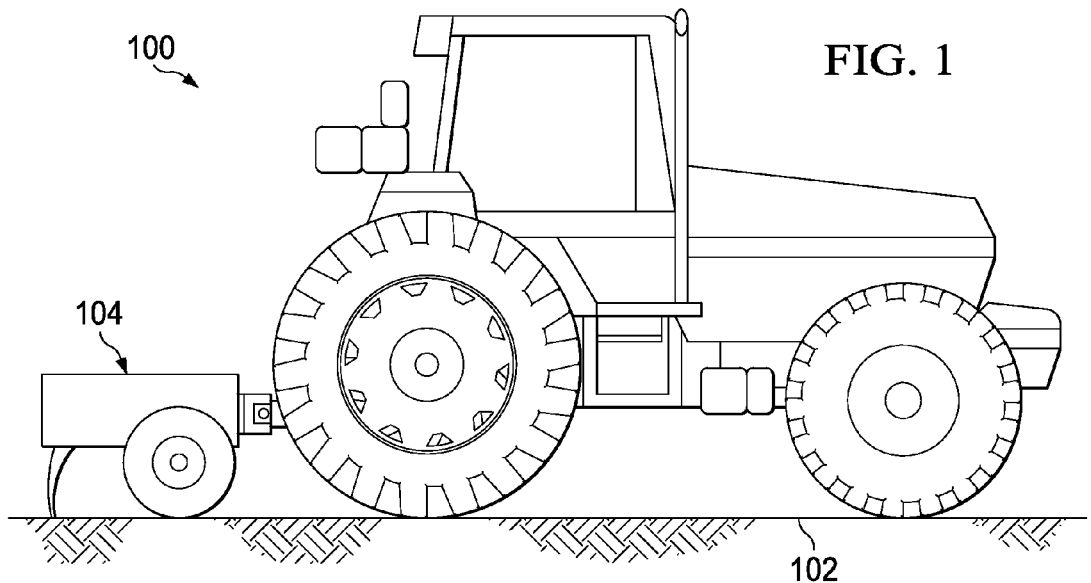
FIG. 1 shows an automatic seed planter attached to a tractor, in accordance with an illustrative embodiment.

Attention is now turned to the Figures. FIG. 1 shows a seed planter attached to a tractor, in accordance with an illustrative embodiment. Tractor 100 may traverse field 102 as part of a planting operation, including a multiple variety planting operation. Tractor 100 may tow seed planting machine 104, which plants seeds in field 102 as tractor 100 moves. Seed planting machine 104 may include a vacuum seed meter, as shown in FIG. 2.

Figure 2:
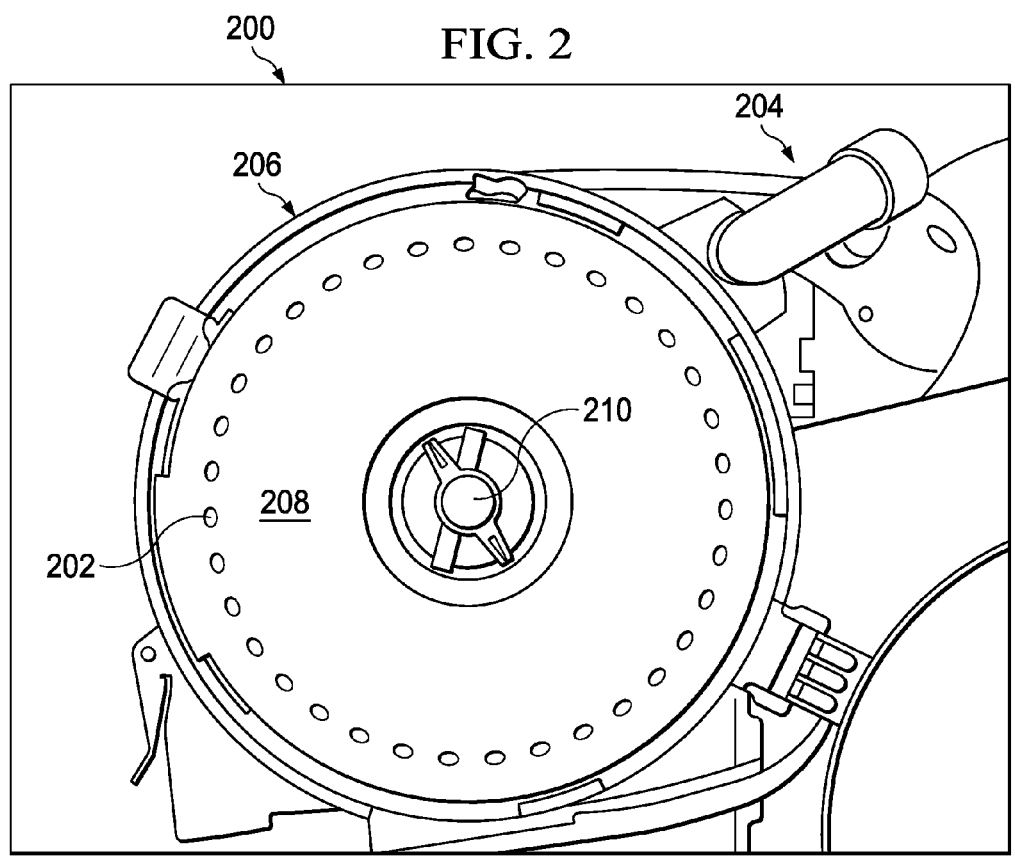
FIG. 2 shows an example of one type of vacuum seed meter, in accordance with an illustrative embodiment.

FIG. 2 shows an example of one type of vacuum seed meter, in accordance with an illustrative embodiment. Vacuum seed meter 200 may be used in a seed planting machine, such as seed planting machine 104 of FIG. 1. Such a seed planting machine may include multiple vacuum seed meters, such as vacuum seed meter 200. Vacuum seed meter 200 of FIG. 2 is only an example of a wide variety of vacuum seed meters. Thus, the arrangement of vacuum seed meter 200 in FIG. 2 does not necessarily limit the claimed inventions.

Vacuum seed meter 200 includes seed disk 208 having multiple apertures, such as aperture 202. Vacuum system 204 may draw air through these apertures and create a partial vacuum within housing 206. As a result, seeds fed to vacuum seed meter 200 from a hopper are drawn to be held against the apertures. A double eliminator (not shown) may then be used to reduce the incidence of doubles, which again is the dispensing of two seeds where only one seed is desired to be dispensed.

In use, seed disk 208 may rotate about hub 210 while vacuum system 204 draws a vacuum through at least some of the apertures, such as aperture 202. Seeds may be dispensed as gravity causes seeds to fall from the apertures when the vacuum is released and through an opening in housing 206.

While one disk, seed disk 208, is shown in FIG. 2, other types of disks may be substituted for seed disk 208. Different disks may have different sizes or arrangements of apertures, may have multiple concentric rings of apertures, and may have other features designed to guide seeds during operation. Selection of the disk to be used may be based on the type of seed and seed variety to be planted.

Figure 3:
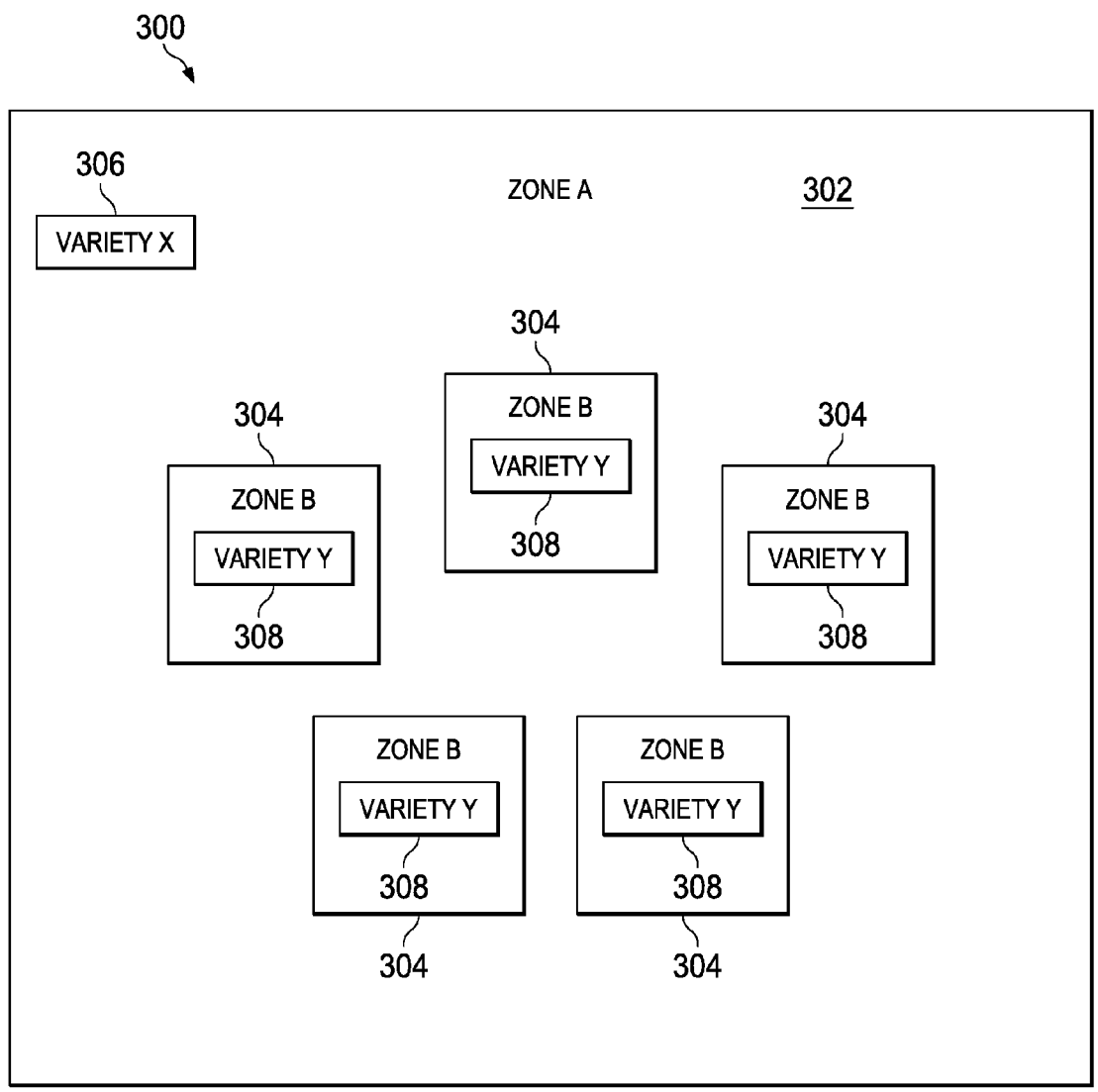
FIG. 3 is a block diagram illustrating zones of a field, wherein a different variety of seed is to be planted in each different zone, in accordance with an illustrative embodiment.

FIG. 3 is a block diagram illustrating zones of a field, wherein a different variety of seed is to be planted in each different zone, in accordance with an illustrative embodiment. FIG. 3 shows a map-based prescription for which varieties of seed are to be planted in different zones of field 300 during a multiple variety planting operation. In an illustrative embodiment, seed planting machine 104 of FIG. 1 will be used to plant seeds in field 300. One or more vacuum seed meters, such as vacuum seed meter 200 of FIG. 2, will be used to plant the seeds. The same vacuum seed meters will be used to plant each different variety of seed in the various zones of field 300.

Field 300 includes two zones, zone A 302 and zone B 304. More zones could be present. Each of these zones is to receive a different variety of seed. For example, variety X 306 is to be planted in zone A 302 and variety Y 308 is to be planted in zone B 304. Multiple zones of the same type may be present in field 300. For example, as shown in FIG. 3, five instances of zone B 304 may be present. Areas in between these zones are all part of zone A 302, in which variety X 306 is to be planted. Because the arrangement of instances of zone B 304 shown in FIG. 3 are dispersed within another zone, zone A 302, manual adjustment of a seed planting machine would be inconvenient, impractical, or impossible.

In an illustrative embodiment, field 300 is being planted using a single plant species, such as corn, wheat, or some other plant. Each variety is a variety of that single plant species. For example, variety X 306 may have a very high crop yield of corn, but a lower resistance to disease. Because a higher incidence of disease has historically occurred in zone B 304, a relatively lower crop yield but more disease resistant variety of corn, variety Y 308, may be planted in zone B 304. Likewise, for different reasons, different varieties of corn may be planted in each different zone. Thus, field 300 shows a map-based prescription for which variety of seed is to be planted in a given zone of field 300. This map-based prescription may be designed to maximize the overall total crop yield for field 300.

One variety of seed may have different physical characteristics from another variety of seed, such as different size, shape, or weight. Each vacuum seed meter may be adjusted to accommodate these different physical characteristics so that efficiency of planting is optimized for a given variety of seed in a given zone. Maximum planting efficiency may be defined in one example as defined as eliminating all, or substantially all, skips and doubles to maximize the seed spacing consistency. Optimizing planting efficiency is defined as achieving as close to maximum planting efficiency as possible for a given vacuum seed meter or other seed planting machine.

Figure 4:
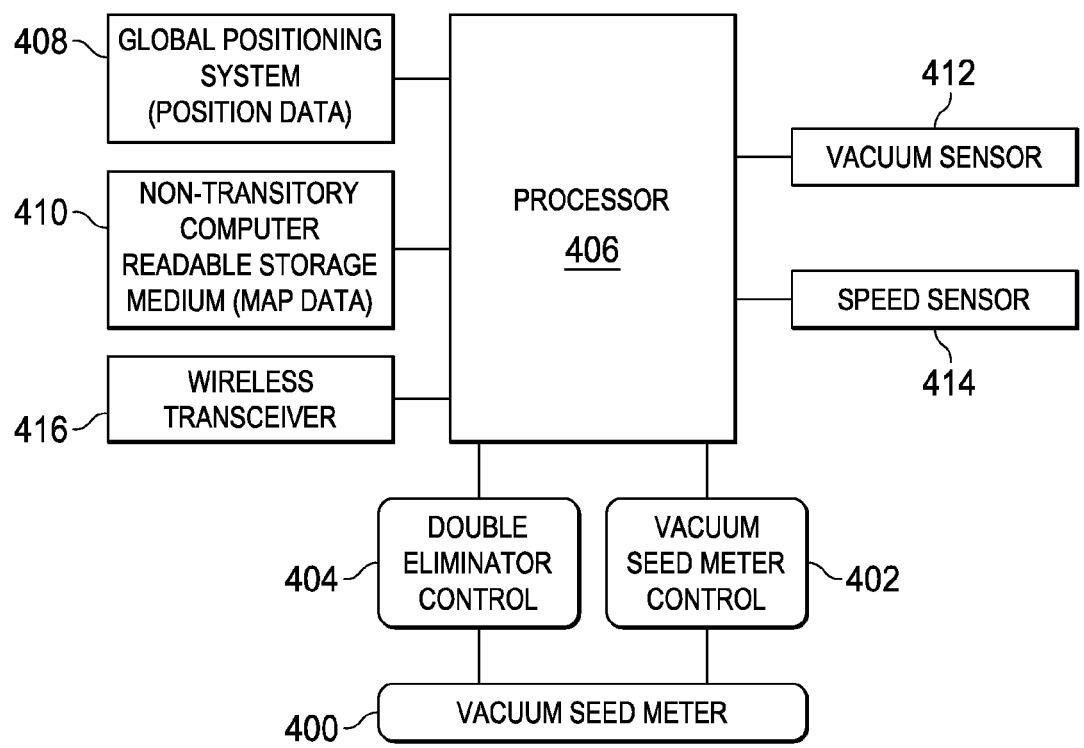
FIG. 4 shows a block diagram of a system for automatically controlling a vacuum seed meter, in accordance with an illustrative embodiment.

FIG. 4 shows a block diagram of a system for automatically controlling a vacuum seed meter, in accordance with an illustrative embodiment. Vacuum seed meter 400 may be, for example, vacuum seed meter 200 of FIG. 2, which in turn may be part of seed planting machine 104 in FIG. 1. The arrangement of blocks shown in FIG. 4 is not necessarily limiting of the claimed inventions, and more and fewer blocks may be present, as described in part below.

Vacuum seed meter control 402 may control operation of vacuum seed meter 400. In particular, vacuum seed meter control 402 may control the amount of vacuum applied within the vacuum seed meter. However, vacuum seed meter control 402 may control other aspects of operation of the vacuum seed meter, including but not limited to disk rotation speed or other controllable aspects of a vacuum seed meter.

If a double eliminator is present in vacuum seed meter, then double eliminator control 404 may control operation of a double eliminator in the vacuum seed meter. In some cases double eliminator control 404 may be part of vacuum seed meter control 402.

In turn, processor 406 issues commands to control vacuum seed meter control 402 and, if present, double eliminator control 404. Processor 406 may take as input data from a variety of sources. For example, processor 406 may take position data from global positioning system 408, the position data informing processor 406 of where the seed planting machine is located. Processor 406 may also retrieve or receive map data stored on non-transitory computer readable storage medium 410. The map data includes a map of a field that may be divided into zones, along with a map-based prescription of what seed varieties are to be planted in a given zone. Processor 406 may use the position data and the map data to determine when the seed planting machine has changed zones within a field. Upon detecting a change in zone, processor 406 may order vacuum seed meter control 402 and double eliminator control 404 to change settings of the vacuum, the double eliminator, or other parameters of vacuum seed meter 400 in order to optimize planting of a new and different variety of seed.

Processor 406 may also take as input data from vacuum sensor 412 and/or speed sensor 414 to measure a vacuum within vacuum seed meter 400 and a speed of the seed planting machine. These data may be used to either verify that vacuum seed meter 400 is operating as desired for the zone being planted, or to modify operation of double eliminator control 404 and/or vacuum seed meter control 402 to optimize planting efficiency of the desired seed variety.

Processor 406 may communicate with the various other systems described in FIG. 4 by means of wireless transceiver 416. However, communication also may be established by wired communications, or a combination of wired and wireless communications for different components.

The blocks shown in FIG. 4 may be varied, and more or fewer blocks may be present. For example, in some cases a double eliminator may not be desired or available, and thus double eliminator control 404 may not be present. In another example, other sensors may be used to gather additional data that processor 406 can use to further modify operation of vacuum seed meter control 402. Additional equipment may be present as part of vacuum seed meter 400, and additional sensors and controls may be present to control operation of this additional equipment. Further modifications may be made; thus, the features shown in FIG. 4 do not necessarily limit the claimed inventions.

Figure 5:
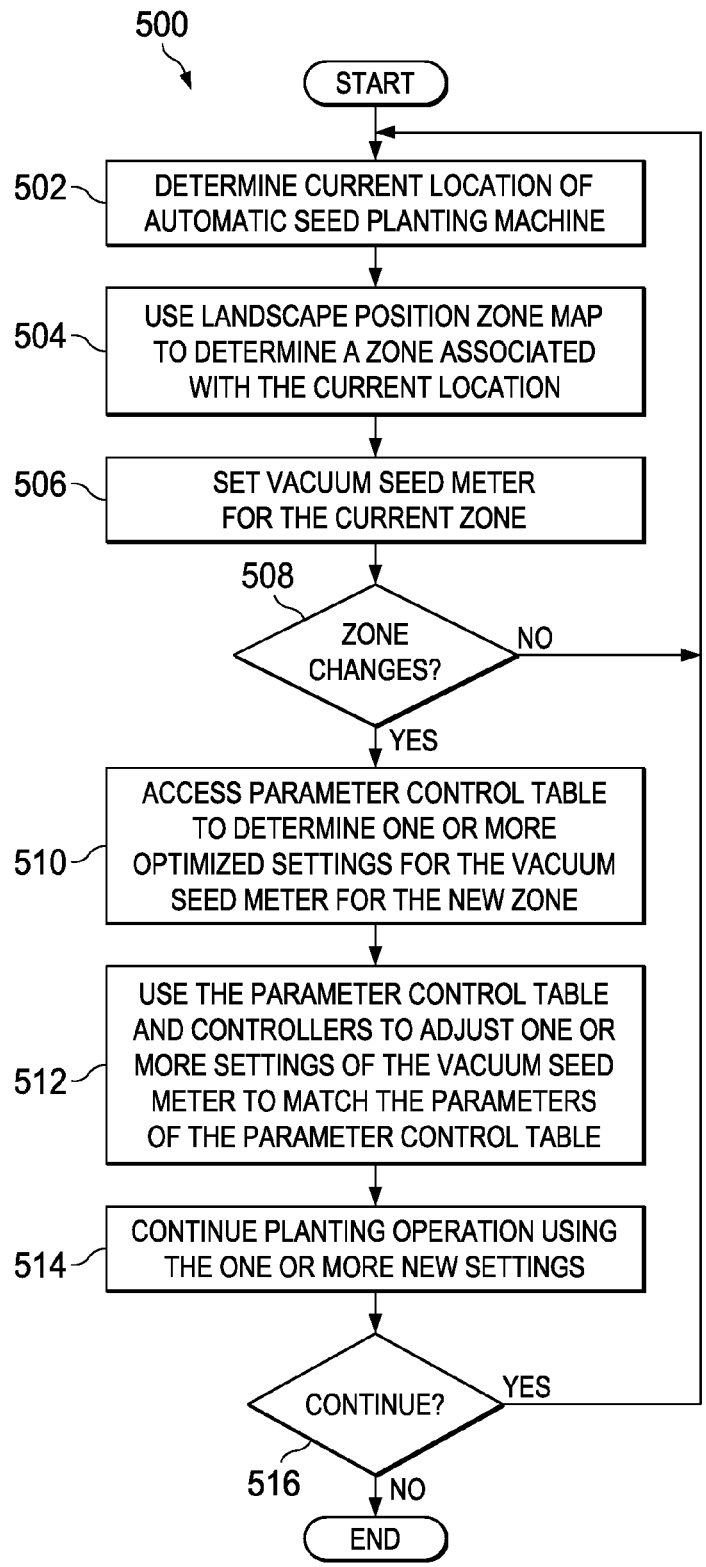
FIG. 5 illustrates an example of a method for performing a multiple variety planting operation using a control system, in accordance with an illustrative embodiment.

FIG. 5 illustrates an example of a method for performing a multiple variety planting operation using a control system, in accordance with an illustrative embodiment. The control system may be, for example, the control system shown in FIG. 4. The operations of method 500 are described as being carried out by a "system". As used herein, the "system" may be one or more components of the control system shown in FIG. 4. Method 500 is implemented using one or more physical components, including one or more of a processor, a non-transitory computer readable storage medium, and physical equipment including a seed planting machine.

Method 500 begins as the system determines a current location of the seed planting machine (operation 502). The system then uses a landscape position zone map to determine a zone associated with the current location (operation 504). The system sets a vacuum seed meter for the current zone (operation 506). The vacuum seed meter may be part of the seed planting machine.

The system then determines whether the zone changes (operation 508). If the zone does not change, then the method returns to operation 502 in order to continue to monitor the zone in which the seed planting machine is located and to continue the setting for the vacuum seed meter of the seed planting machine. However, if the zone does change, then the system accesses a parameter control table to determine one or more optimized settings for the vacuum seed meter for the new zone (operation 510). The parameter control table may be a table, or other data not necessarily in table form, that specifies for a given zone one or more settings to be used for the vacuum seed meter, double eliminator, or other parts of a seed planting machine. For example, the parameter control table may specify that for zone A 302 of FIG. 3 the vacuum pressure may be at or about a specified value, that the double eliminator be adjusted in a particular manner, and/or some other aspect of the seed planting machine be adjusted while performing a planting operation in zone A 302.

The system then uses the parameter control table and controllers to adjust one or more settings of the vacuum seed meter to match the parameters of the parameter control table (operation 512). Other aspects or components of the seed planting machine may also be adjusted accordingly, if desired. In any case, the system continues the planting operation using the one or more new settings (operation 514).

The system may then determine whether the planting operation should continue (operation 516). If the planting operation should continue, then the method may return to operation 502 and continue accordingly. Otherwise, the process may terminate thereafter.

Method 500 does not necessarily limit the claimed inventions. Alternative methods having more, fewer, or different operations are possible. For example, FIG. 6 and FIG. 7 provide for alternative methods.

FIG. 6 is a flowchart of a method of adjusting a changeable component, in accordance with an illustrative embodiment. Method 600 of FIG. 6 is an alternative method to controlling a seed planting machine, relative to method 500 of FIG. 5. Method 600 may be implemented using the control system shown in FIG. 4 using vacuum seed meter 200 of FIG. 2 and seed planting machine 104 of FIG. 1.

In an illustrative embodiment, method 600 includes adjusting a changeable component of a seed planting machine when switching from a first variety of seed to a second variety of seed during planting, wherein the adjusting is based on a location of the seed planting machine (operation 602). The process may terminate thereafter.

Method 600 may be modified by adding additional operations or modifying operation 602. For example, the component may be a double eliminator configured to prevent multiple seeds from being planted at a particular location. In another example, the seed planting machine comprises a vacuum seed meter, and wherein adjusting the changeable component comprises adjusting a vacuum level applied to the vacuum seed meter.

In another example, the seed planting machine includes a double eliminator and a vacuum seed meter. In this case, operation 602 may include changing the double eliminator to prevent multiple seeds from being planted at a particular location, and adjusting a vacuum level applied to the vacuum seed meter. In another example, adjusting configures the seed planting machine to maximize performance of planting of the one of the plurality of different varieties of seed.

FIG. 7 is a flowchart of a method of planting seeds, in accordance with an illustrative embodiment. Method 700 of FIG. 7 is an alternative method to controlling a seed planting machine, relative to method 500 of FIG. 5 or method 600 of FIG. 6. Method 700 may be implemented using the control system shown in FIG. 4 using vacuum seed meter 200 of FIG. 2 and seed planting machine 104 of FIG. 1.

Method 700 may begin by planting a first variety of seed in a first location of a field of land using a planting machine, the planting machine comprising a component, the component having a first setting configured to improve a first performance of the planting machine when planting the first variety of seed, wherein the first performance is gauged relative to the planting machine planting the first variety of seed using other settings of the component (operation 702). Next, method 700 may include sensing that the planting machine will reach or has reached a second location of the field, different than the first location, wherein a second variety of seed, different than the first variety of seed, is to be planted in the second location (operation 704).

Next, method 700 may include, responsive to sensing, automatically adjusting the component of the planting machine to a second setting, the second setting configured to improve a second performance of the planting machine while planting the second variety of seed, wherein the second performance is gauged relative to the planting machine planting the second variety of seed using other settings of the component (operation 706). Next, method 700 may include planting the second variety of seed in the second location of the field using the component at the second setting (operation 708). The process may terminate thereafter.

Method 700 may be modified by replacing, removing, adding, or modifying operations. Thus, method 700 does not necessarily limit the claimed inventions.

For example, in an illustrative embodiment the component is a double eliminator to prevent multiple seeds from being planted during a given planting operation at a particular location, and wherein automatically adjusting comprises changing the setting of the double eliminator to a second setting. In another example, the component is a vacuum seed meter, and wherein automatically adjusting comprises changing a level of vacuum applied to the vacuum seed meter.

In still another example, the component includes both a double eliminator to prevent multiple seeds from being planted during a given planting operation at a particular location, and a vacuum seed meter. In this case, automatically adjusting includes changing the double eliminator to a second setting changing the level of vacuum applied to the seed meter to a second setting.

Figure 8:
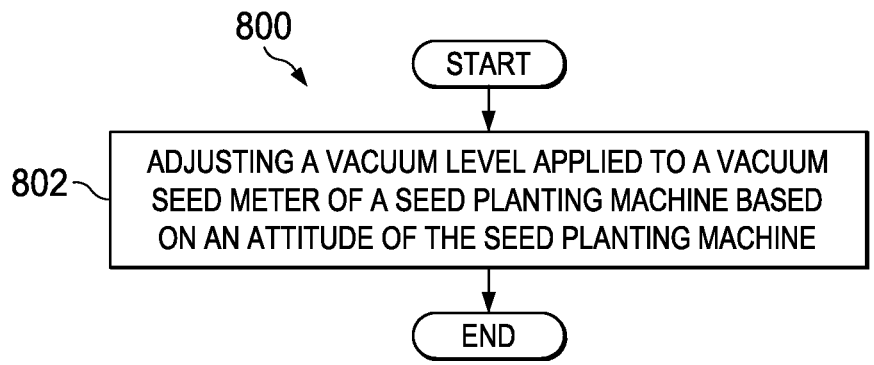
FIG. 8 is a flowchart of a method of planting seeds, in accordance with an illustrative embodiment.

FIG. 8 is a flowchart of a method of planting seeds, in accordance with an illustrative embodiment. Method 800 of FIG. 8 is an alternative method to controlling a seed planting machine, relative to method 500 of FIG. 5, method 600 of FIG. 6, or method 700 of FIG. 7. Method 800 may be implemented using the control system shown in FIG. 4 using vacuum seed meter 200 of FIG. 2 and seed planting machine 104 of FIG. 1.

Method 800 includes adjusting a vacuum level applied to a vacuum seed meter of a seed planting machine based on an attitude of the seed planting machine (operation 802). Method 800 represents an alternative or possibly additional parameter used to control a seed planting machine or vacuum seed meter. For example, FIG. 3 illustrates one principle of operation, which is to use a map-based prescription for controlling optimization of which variety of seed is to be planted within a given zone. In addition, an attitude of the seed planting machine may be used to control the vacuum pressure, double eliminator settings, and/or other aspects of a seed planting machine.

In an example embodiment, "attitude" refers to a tilt of the seed planting machine relative to a plane perpendicular to the direction of the force of gravity. For example, a seed planting machine has an attitude of zero when it is level, but may have a non-zero attitude when on a slope of a hill. Sometimes, the attitude of the seed planting machine side-to-side may affect how much vacuum is needed to optimize the pick-up of seeds on the seed disk. In this case, adjustment of a meter parameter does not use a map based approach but rather simply a tilt of the seed planting machine may be monitored. However, in a different illustrative embodiment, a zone of a field, such as described with respect to FIG. 3, may be designated because the ground in that zone has a slope. Thus, the illustrative embodiments described with respect to FIGS. 3-7 may still be applied to a zone defined because the ground has a slope within that zone.

Nevertheless, method 800 may be further modified or may have additional operations. For example, the attitude of the seed planting machine may be detected by a sensor. In another illustrative embodiment, the attitude of the seed planting machine may be determined based on a location of the seed planting machine in a field, a map of the field containing information of field contours and a direction of travel of the seed planting machine. In still another illustrative embodiment, adjusting configures the seed planting machine to maximize performance of planting of one of a plurality of different varieties of seed.

In yet another illustrative embodiment, the seed planting machine further includes a double eliminator configured to prevent multiple seeds from being planted at a particular location. In this case, the method may further include adjusting the double eliminator based on the attitude. Additionally, adjusting the vacuum level and adjusting the double eliminator together may configure the seed planting machine to maximize performance of planting of one of a plurality of different varieties of seed.

Figure 9:
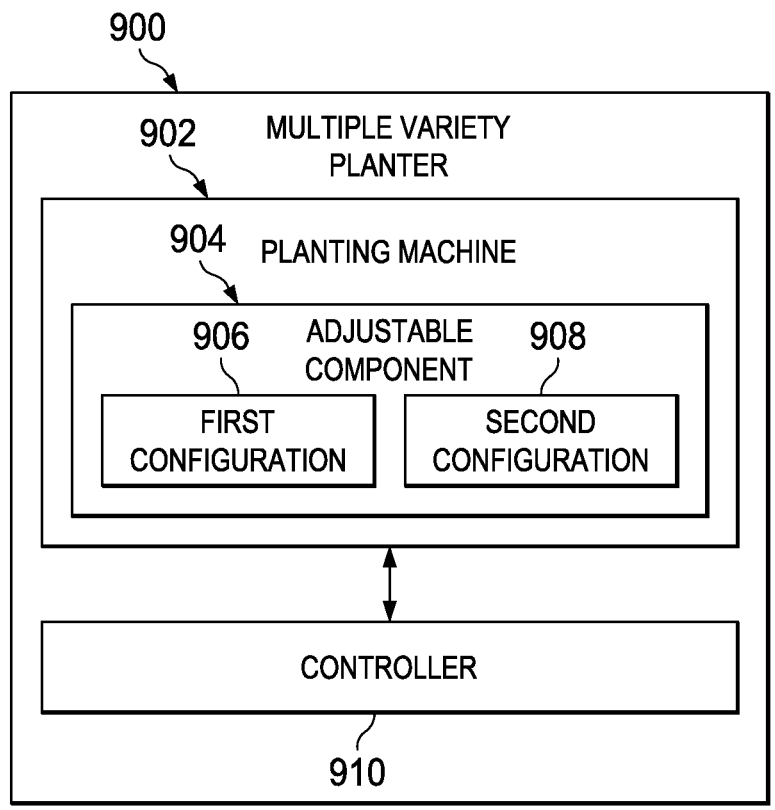
FIG. 9 is a block diagram of a multiple variety planter, in accordance with an illustrative embodiment.

FIG. 9 is a block diagram of a multiple variety planter, in accordance with an illustrative embodiment. Multiple variety planter 900 may be seed planting machine 104 of FIG. 1. Multiple variety planter 900 may include vacuum seed meter 200 of FIG. 2. Multiple variety planter 900 may include or be in communication with the control system shown in FIG. 4. Multiple variety planter 900 may be used to implement any of the methods shown in FIG. 5 through FIG. 8.

Multiple variety planter 900 may include planting machine 902. Planting machine may include adjustable component 904. Adjustable component 904 may be adjustable between first configuration 906 and second configuration 908. First configuration 906 may be set to maximize planting efficiency of a first variety of seed relative to other varieties of seeds. Second configuration 908 may be set to maximize planting efficiency of a second variety of seed relative to other varieties of seeds.

Multiple variety planter 900 may also include controller 910 in communication with planting machine 902. Controller 910 may be configured to automatically adjust adjustable component 904 between first configuration 906 and second configuration 908 based on a particular location of planting machine 902 in a field of land comprising a plurality of different locations that include the particular location.

Multiple variety planter 900 may be varied or modified. For example, controller 910 may be one or more components of the control system shown in FIG. 4. In another example, adjustable component 904 may be a double eliminator to prevent multiple seeds from being planted in the particular location. In still another example, adjustable component 904 may be a vacuum control system configured to control a vacuum level applied to a vacuum seed meter configured to dispense seeds during a given planting operation.

In yet another example, adjustable component 904 may further be a double eliminator. In other words, adjustable component 904 includes both a vacuum control system and a double eliminator. In this case, the double eliminator may be configured to prevent multiple seeds from being planted in the particular location during a given planting operation. Additionally, both the double eliminator and the vacuum control system are configured to be adjusted as part of the adjustable component being adjusted.

FIG. 10 is an illustration of a data processing system, in accordance with an illustrative embodiment. Data processing system 1000 in FIG. 10 is an example of a data processing system that may be used to implement the illustrative embodiments, such as the control system shown in FIG. 4. For example, processor unit 1004 may be processor 406 of FIG. 4 and computer readable media 1020 may be non-transitory computer readable storage medium 410 of FIG. 4. Data processing system 1000 and computer readable media 1020 of FIG. 10 may be used to implement any of the methods shown in FIG. 5 through FIG. 8. Data processing system 1000 and computer readable media 1020 of FIG. 10 may be used as part or all of controller 910 of FIG. 9.

In this illustrative example, data processing system 1000 includes communications fabric 1002, which provides communications between processor unit 1004, memory 1006, persistent storage 1008, communications unit 1010, input/output (I/O) unit 1012, and display 1014. Processor unit 1004 serves to execute instructions for software that may be loaded into memory 1006. Processor unit 1004 may be a number of processors, a multi-processor core, or some other type of processor, depending on the particular implementation. A number, as used herein with reference to an item, means one or more items. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output (I/O) unit 1012 allows for input and output of data with other devices that may be connected to data processing system 1000. For example, input/output (I/O) unit 1012 may provide a connection for user input through a keyboard, a mouse, and/or some other suitable input device. Further, input/output (I/O) unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage

1008. These instructions may be loaded into memory 1006 for execution by processor unit 1004. The processes of the different embodiments may be performed by processor unit 1004 using computer implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these examples. In one example, computer readable media 1020 may be computer readable storage media 1024 or computer readable signal media 1026. Computer readable storage media 1024 may include, for example, an optical or magnetic disk that is inserted or placed into a drive or other device that is part of persistent storage 1008 for transfer onto a storage device, such as a hard drive, that is part of persistent storage 1008. Computer readable storage media 1024 also may take the form of a persistent storage, such as a hard drive, a thumb drive, or a flash memory, that is connected to data processing system 1000. In some instances, computer readable storage media 1024 may not be removable from data processing system 1000.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1018 may be omitted because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

As another example, a storage device in data processing system 1000 is any hardware apparatus that may store data. Memory 1006, persistent storage 1008, and computer readable media 1020 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1006, or a cache, such as found in an interface and memory controller hub that may be present in communications fabric 1002.

The different illustrative embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method comprising:
   planting a first variety of seed in a first location of a field of land using a planting machine, the planting machine comprising a component, the component having a first setting configured to improve a first performance of the planting machine when planting the first variety of seed, wherein the first performance is gauged relative to the planting machine planting the first variety of seed using other settings of the component;
   sensing that the planting machine will reach or has reached a second location of the field, different than the first location, wherein a second variety of seed, different than the first variety of seed, is to be planted in the second location;
   responsive to sensing, automatically adjusting the component of the planting machine to a second setting, the second setting configured to improve a second performance of the planting machine while planting the second variety of seed, wherein the second performance is gauged relative to the planting machine planting the second variety of seed using other settings of the component; and
   planting the second variety of seed in the second location of the field using the component at the second setting.

2. The method of claim 1, wherein the component comprises a double eliminator to prevent multiple seeds from being planted during a given planting operation at a particular location, and wherein automatically adjusting comprises changing the setting of the double eliminator to a second setting.

3. The method of claim 1, wherein the component comprises a vacuum seed meter, and wherein automatically adjusting comprises changing a level of vacuum applied to the vacuum seed meter.

4. The method of claim 1, wherein the component comprises a double eliminator to prevent multiple seeds from being planted during a given planting operation at a particular location, and a vacuum seed meter, and wherein automatically adjusting comprises:
   changing the double eliminator to a second setting; and
   changing a level of vacuum applied to the vacuum seed meter to a second setting.

5. The method of claim 4 wherein automatically adjusting is commanded by a computer which stores double eliminator settings in map data that includes a first setting for the first location and a second setting for the second location, wherein the computer commands automatically adjusting the double eliminator to the second setting upon the sensing, wherein automatically adjusting is further commanded by a computer which stores vacuum settings in map data that includes a third setting for the first location and a fourth setting for the second location, and wherein the computer commands automatically adjusting the vacuum seed meter to the fourth setting upon the sensing.

6. A method comprising:
   planting a first variety of seed in a first location of a field of land using a planting machine, the planting machine comprising a component, the component having a first setting configured to improve a first performance of the planting machine when planting the first variety of seed, wherein the first performance is gauged relative to the planting machine planting the first variety of seed using other settings of the component;
   sensing that the planting machine will reach or has reached a second location of the field, different than the first location, wherein a second variety of seed, different than the first variety of seed, is to be planted in the second location;
   responsive to sensing, automatically adjusting the component of the planting machine to a second setting, the second setting configured to improve a second performance of the planting machine while planting the second variety of seed, wherein the second performance is gauged relative to the planting machine planting the second variety of seed using other settings of the component; and
   planting the second variety of seed in the second location of the field using the component at the second setting; and
   wherein the component comprises a double eliminator to prevent multiple seeds from being planted during a given planting operation at a particular location, and wherein automatically adjusting comprises changing the setting of the double eliminator to a second setting.

7. The method of claim 6 wherein automatically adjusting is commanded by a computer which stores double eliminator settings in map data that includes a first setting for the first location and a second setting for the second location, and wherein the computer commands automatically adjusting the double eliminator to the second setting upon the sensing.

8. A method comprising:
   planting a first variety of seed in a first location of a field of land using a planting machine, the planting machine comprising a component, the component having a first setting configured to improve a first performance of the planting machine when planting the first variety of seed, wherein the first performance is gauged relative to the planting machine planting the first variety of seed using other settings of the component;
   sensing that the planting machine will reach or has reached a second location of the field, different than the first location, wherein a second variety of seed, different than the first variety of seed, is to be planted in the second location;
   responsive to sensing, automatically adjusting the component of the planting machine to a second setting, the second setting configured to improve a second performance of the planting machine while planting the second variety of seed, wherein the second performance is gauged relative to the planting machine planting the second variety of seed using other settings of the component; and
   planting the second variety of seed in the second location of the field using the component at the second setting; and
   wherein the component comprises a vacuum seed meter, and wherein automatically adjusting comprises changing a level of vacuum applied to the vacuum seed meter.

9. The method of claim 8 wherein automatically adjusting is commanded by a computer which stores vacuum settings in map data that includes a first setting for the first location and a second setting for the second location, and wherein the computer commands automatically adjusting the vacuum seed meter to the second setting upon the sensing.

* * * * *

UNITED STATES PATENT AND TRADEMARK OFFICE
CERTIFICATE OF CORRECTION

| | |
|---|---|
| PATENT NO. | : 9,585,303 B2 |
| APPLICATION NO. | : 14/327844 |
| DATED | : March 7, 2017 |
| INVENTOR(S) | : Rylander |

It is certified that error appears in the above-identified patent and that said Letters Patent is hereby corrected as shown below:

On the Title Page

Item (72), Sole Inventor Name:
Please change "Dave J. Rylander" to "David J. Rylander"

Signed and Sealed this
Twenty-first Day of May, 2019

Andrei Iancu
*Director of the United States Patent and Trademark Office*